United States Patent [19]

Spain

[11] 3,786,451

[45] Jan. 15, 1974

[54] MAGNETIC THIN FILM SHIFT REGISTER HAVING BIDIRECTIONAL TRANSMISSION ELEMENTS AND ALTERNATELY-PAIRED BLOCK SITES

[75] Inventor: Robert J. Spain, Waban, Mass.

[73] Assignee: Cambridge Memories, Inc., Newton, Mass.

[22] Filed: May 1, 1972

[21] Appl. No.: 248,813

[52] U.S. Cl. 340/174 FB, 340/174 ZB, 340/174 FB, 340/174 AC, G11c/11/14

[51] Int. Cl. .......... G11c 19/00

[58] Field of Search .......... 340/174 FB, 174 SR, 340/174 MC, 174 AC, 174 TF

[56] References Cited

UNITED STATES PATENTS

| | | | |
|---|---|---|---|
| 3,562,722 | 2/1971 | Jauvtis | 340/174 FB |
| 3,656,126 | 4/1972 | Jauvtis | 340/174 FB |

*Primary Examiner*—Stanley M. Urynowicz, Jr.

*Attorney*—Melvin R. Jenney et al.

[57] ABSTRACT

A digital shift register propagating information as discrete regions of reverse magnetization has a bidirectional transmission path and has means for producing magnetic fields both continuously along the transmission path and only at selected sites along the path. Successive locations along the path are organized into a set of first locations alternated with a set of second locations. In each shift cycle, magnetic fields first block propagation of a magnetic region along the path except from each first location to the next second location, and then block propagation except from each second location to the next first location.

12 Claims, 9 Drawing Figures

MAGNETIC THIN FILM SHIFT REGISTER HAVING BIDIRECTIONAL TRANSMISSION ELEMENTS AND ALTERNATELY-PAIRED BLOCK SITES

BACKGROUND OF THE INVENTION

This invention relates to a digital register for storing and shifting information in the form of discrete regions of unique magnetization. In particular, the invention provides a magnetic thin film shift register employing a bidirectional magnetic transmission path of elemental configuration and arranged with two adjacent locations therealong in each register stage. The register has means for producing magnetic fields for first blocking propagation along the path except between the two locations within each stage and for then blocking propagation except between the adjacent locations of adjacent stages.

The shift register operates by storing and propagating, for each unit of information being processed, a domain of reverse magnetization in an anisotropic magnetic film. The register moves the domain by the technique of domain tip propagation. According to this technique, a narrow channel of relatively low magnetic coercivity is formed in a body of anisotropic ferromagnetic material that otherwise has a relatively high magnetic coercivity. The magnetization of the body of material is saturated along the easy axis in a forward direction, and the channel extends longitudinal to this axis. A domain of reverse magnetization nucleated at an input point along the channel is propagated along the channel by a magnetic field smaller than the nucleating field but having the same polarity. U.S. Pat. No. 3,438,006, which describes one manufacture of the foregoing low-coercivity channel structure, describes AND, OR and like logic elements for processing information according to domain tip propagation, and U.S. Pat. No. 3,465,316 describes non-reciprocal, i.e. unidirectional, domain tip propagation devices. Further, U.S. Pat. Nos. 3,438,016 and 3,562,722 describe domain tip propagation shift registers that are considered to be prior art for the present invention.

An object of this invention is to provide a shift register of digital information represented by discrete regions of magnetization and which has a bidirectional and generally lineal transmission path for the magnetic regions.

Another object of the invention is to provide a shift register of digital information represented by discrete regions of magnetization and which operates with positive inhibiting of domain propagation beyond prescribed locations.

It is also an object of the invention to provide a magnetic thin film shift register of the above character capable of operation with relatively little dependence on the precise propagation velocity of the magnetic regions.

Another object is to provide a magnetic thin film shift register capable of bidirectional operation, and further capable of bidirectional operation with only a change in the timing of one control field.

A further object of the invention is to provide a shift register of the above character capable of reliable operation with magnetic fields having relatively wide magnitude tolerances. A similar object is to provide such a shift register capable of reliable operation with minimal dependence on the rise times of the propagation fields.

Another object of the invention is to provide a construction for a shift register of the above character which can be fabricated with higher information density than prior constructions.

Other objects of the invention will in part be obvious and will in part appear hereinafter.

SUMMARY OF THE INVENTION

A shift register according to the invention has bidirectional magnetic domain transmission elements serially arranged along a shift register path with alternate transmission elements being denominated first elements and second elements. The shift register operates on a cyclic basis in which an information-bearing domain in a first transmission element is shifted to the adjacent second transmission element and then to the next successive first transmission element.

A first current conductor subjects all the transmission elements to a domain-propagating field directed along the elements and, alternatively, to an erase field of opposite polarity. A second current conductor subjects the first transmission elements to a localized, domain-preserving hold field and, alternatively, subjects the second transmission elements to the hold field. One or the other of the hold fields is produced simultaneously with the erase field to preserve the information-bearing domains at a corresponding one of the two sets of transmission elements during the erasure of reverse magnetization domains from elsewhere along the shift register path.

The shift register also has means for producing either of two sets of block fields that restrict domain propagation in response to the drive field. Like the hold fields, the block fields are localized. In the portion of each cycle during which a domain in a first transmission element is propagated to the next, second transmission element, one set of block fields opposes the drive field to prevent propagation of the domain backward toward the preceding transmission element, and to prevent propagation forward beyond the next, second transmission element. Alternatively, in the portion of each cycle during which domains are being propagated from second transmission elements to the next first transmission elements, the other set of block fields precludes backward propagation of the domains and blocks forward propagation beyond the next, first transmission elements.

This arrangement of magnetic fields makes it possible for the shift register to have a simple, straight-line pattern of transmission elements that can be manufactured readily with high yield and hence at relatively low cost. Further, the operation of this shift register has minimal dependence on geometrically-induced properties of the transmission elements. Also, a shift register constructed to operate in the foregoing manner can have high information density.

The use of blocking fields at both back and forward directions relative to each domain being propagated provides a positive inhibiting action on the growth of the domains, and the inhibiting action is independent of the domain propagation velocities. Another advantage of the invention is that when the blocking fields are timed to overlap the drive field, variations in the pulse rise time of the drive field current have essentially no effect on the operation of the shift register. Also, where desired, the shift register can be operated to shift information-bearing domains in either direction.

Thus, the net effect of the present arrangement for a magnetic domain shift register is that the device is comparatively small and is free of many of the restrictions and critical manufacturing and operating specifications attendant with the prior art.

Further to the U.S. patents noted above, the copending and commonly-assigned U.S. patent application of Harvey I. Jauvtis for "Magnetic Thin Film Shift Register Having Bidirectional Transmission Elements And Offset Block Sites" filed concurrently herewith, i.e. on May 1, 1972, and bearing Ser. No. 249,082 describes another construction for a domain tip propagation shift register of the present type. The copending and commonly-assigned U.S. patent application of Robert J. Spain and Harvey I. Jauvtis for "Multiplexing Systems For Thin Film Magnetic Propagation Channels" filed concurrently herewith, i.e. on May 1, 1972, and bearing Ser. No. 248,812 describes a system for multiplexing shift registers of the present and like constructions.

The invention accordingly comprises the features of construction, combinations of elements, and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be made to the following detailed description and accompanying drawings, in which.

DESCRIPTION OF ILLUSTRATED EMBODIMENTS

Figure 1:
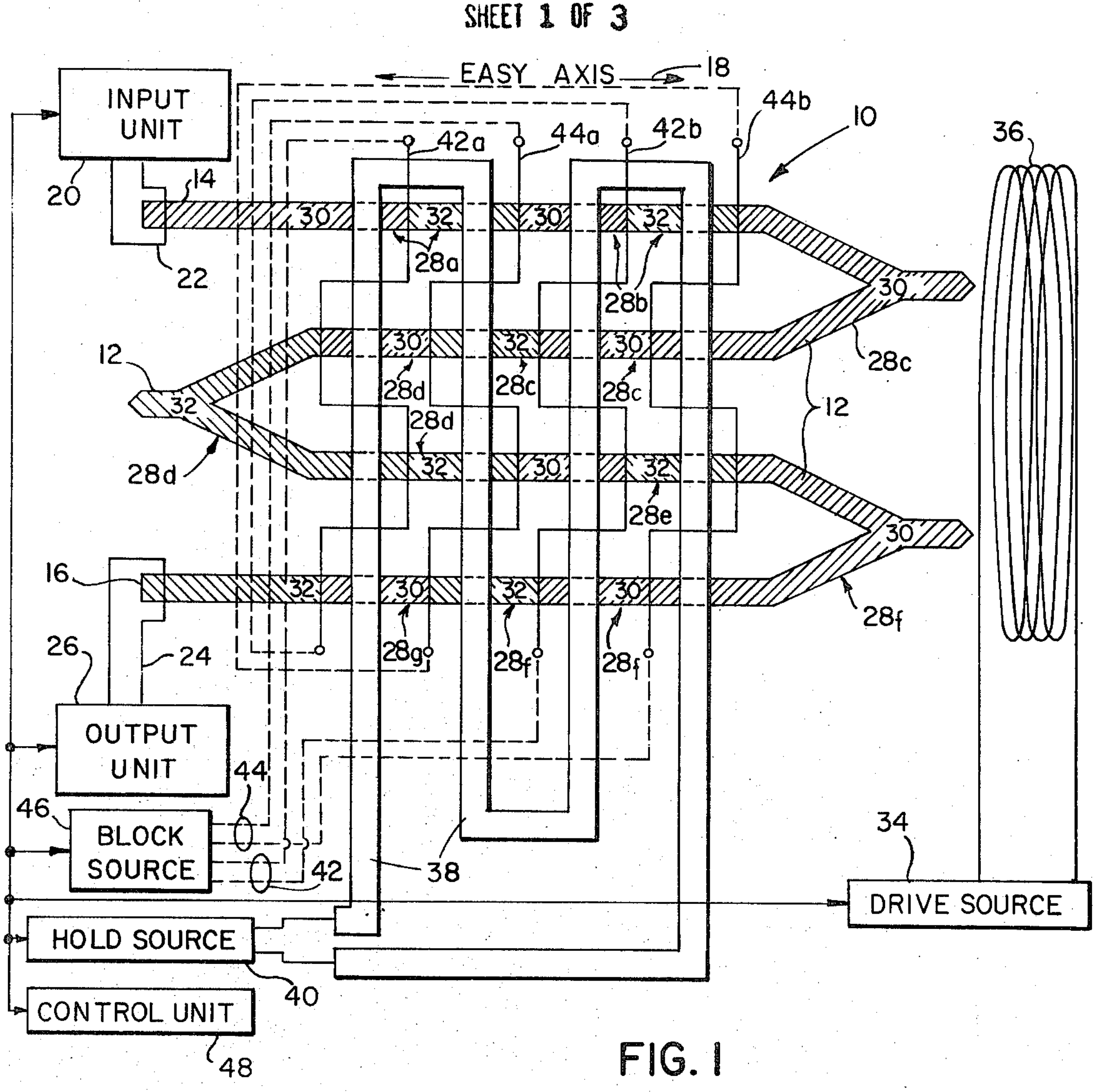
FIG. 1 is a schematic representation of a shift register according to the invention.

FIG. 1 shows a multiple stage shift register 10 embodying the invention and having a signal path 12 extending from an input port 14 to an output port 16. The signal path is a channel of a low coercivity magnetic material bounded along its sides by high coercivity magnetic material. Both materials are magnetically anisotropic with an easy axis oriented along arrow 18. The magnetization of the high coercivity material, and similarly that of the low coercivity material forming the path 12, are initially saturated along the easy axis in a forward direction, which extends from left to right in FIG. 1.

An input unit 20 is connected to a field-producing nucleate element illustrated as a write wire 22 crossing the path 12 at the input port. Direct current in the write wire from the input unit 20 produces a magnetic field in the reverse direction, i.e. from right to left, of sufficient strength to nucleate a domain of reverse magnetization in the path 12 at the input port. Similarly, at the output port 16, a field-sensing element in the form of a read wire 24 inductively coupled to the path is connected to signal an output unit 26 when a domain of reverse magnetization advances to the output port along the path 12.

The illustrated path 12 forms seven shift register stages 28*a*, 28*b*, . . . 28*g* in a series succession between the input port 14 and the output port 16. The path 12 is preferably of essentially uniform construction throughout its length, but each stage 28 is denominated as having a first transmission element 30 in series before a second transmission element 32, so that the path has an alternate sequence of first and second transmission elements. (For clarity of explanation, FIG. 1 shows the different transmission paths 30 and 32 with different shadings.) Further, the illustrated path 12 is folded so as to have four side-by-side legs, by forming, for example, the transmission element 30 in a third stage 28*c* to have a V-like configuration interconnecting two legs of the path.

With further reference to FIG. 1, an electrical source 34 of drive current is connected to a drive conductor 36 arranged to impose a magnetic drive field along the entire path 12 and oriented along the easy axis 18. A drive field directed from right to left in FIG. 1 is termed a propagate field, and an oppositely-directed drive field is termed an erase field. The propagate field has sufficient magnitude to make domains already present in the path 12 to grow along it, but insufficient to nucleate domains. The erase field has sufficient magnitude to erase domains from the shift register path.

As also shown in FIG. 1, a hold conductor 38 connected to a hold source 40 of direct electrical current threads back and forth over all legs of the path 12 to cross each transmission element once, except for the V-configured leg-interconnecting elements which the hold conductor crosses twice. The hold conductor couples a magnetic hold field into each portion of the path 12 which it traverses. The hold field is oriented along the easy axis 18 and has a magnitude substantially equal to the erase field to cancel it when of opposite polarity and thereby prevent domain erasure. The polarity of the current which source 40 applies to the hold conductor determines the polarity of the hold field. Note that, except for the second crossing over leg-interconnecting elements, the hold conductor crosses each first transmission element 30 in the same direction, and crosses each second transmission element in the opposite direction.

The shift register 10 also has two block conductors 42 and 44 that thread across the shift register path 12 at each junction of two transmission elements 30 and 32. In fact, it is the intersection of the block conductors with the path 12 that defines the boundaries of the transmission elements. In particular, each block conductor crosses the path 12 at every second successive junction between transmission elements, so that the block conductor 42 crosses the path at every interelement junction within a stage 28 of the register, while the block conductor 44 crosses the path 12 at every inter-element junction between shift register stages. In addition to the foregoing crossings over the path 12, the block conductors cross each of the V-configured path elements along the length thereof.

The block conductors cross the path 12 to carry current in the direction that produces a magnetic field along the easy axis 18 with a polarity that negates the propagation field at that location and hence blocks domain growth. The illustrated block conductor 42 in FIG. 1 has a conductor segment 42*a* in series with a conductor segment 42*b*, each with a squarewave-like serpentine configuration to cross the folded path in the manner described above. The block conductor 44 is illustrated as having a similar arrangement with two series-connected conductor segments 44*a* and 44*b*. FIG. 1 shows the segments of the block conductors 42 and 44 that traverse the path 12 with solid lines and shows with dashed lines the connections between the conductor segments and the connections to a block source 46. The block source applies direct current to one block conductor at a time, as described below in further detail.

The dashed-line interconnecting segments of the block conductors are located removed from the path 12, typically either by locating them outside the area of the zig-zag path or by locating them in a plane removed from the path 12, so that the magnetic fields produced by current in them does not interact with the other magnetic fields that operate on the path. In a typical construction, the path 12 is planar, and the hold conductors and the block conductor segments 42*a*, 42*b*, 42*c* and 42*d* are in two other planes, respectively.

The shift register 10 also includes a control unit 48 that operates the input unit 20, the output unit 26, and the sources 34, 40 and 46. The control unit can be constructed with conventional skills with known logic and timing circuits to provide the shift register operation detailed below with reference to FIG. 2.

As indicated above, binary digital information is stored and shifted in the register 10 in the form of discrete domains of reverse magnetization. A binary ONE is usually represented by a domain of reverse magnetization, and a binary ZERO represented by the absence of a domain. In essence, the shift register operates by moving a domain along the path 12 from one first transmission element through the next second transmission element to the next first transmission element, in each cycle of operation.

Figure 2:
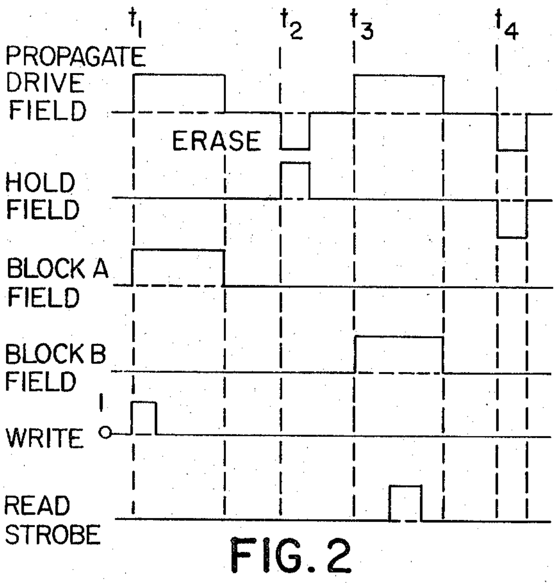
FIG. 2 is a timing chart illustrating the operation of the shift register of FIG. 1.

FIG. 2 shows the waveforms of the magnitudes of the magnetic fields, as a function of time, for operating the shift register in this manner through one cycle.

As shown in FIG. 2, when a ZERO is to be written into the shift register, no action is taken; whereas when a ONE is to be written, the input unit 20 applies a write pulse to the write wire 22 to nucleate a domain of reverse magnetization at the input port 14. The write operation preferably occurs during application of the propagate field to reduce the write ONE field that is required to nucleate a domain, inasmuch as the two fields have the same polarity. However, the write operation can precede the propagate step.

In the operating cycle illustrated in FIG. 2, at time t1 a propagate field is produced, by application of current to the drive conductor 36, simultaneous with the production of a block A field by application of current to the block conductor 42. The propagate field causes the domain just nucleated, if any, at the input port 14 and whatever domains are in second transmission elements 32 to expand along the path 12. However, the block A fields, which block conductor segments 42*a* and 42*b* produce, prevent growth backward to the preceding elements, and prevent growth forward beyond the next first elements 30.

Thus the net effect of the propagate and block A fields produced starting at time *t*1 is to extend each domain present in a second element 32 to the next element 30, as well as to advance a newly-nucleated domain to the element 30 of the first register stage.

The next step in the illustrated cycle is that at time *t*2 the drive source 34 energizes the drive conductor 36 to produce an erase field and at the same time the hold source 40 energizes the hold conductor 38. The erase field tends to erase all domains of reverse magnetization from the path 12, but the hold field produced at this time opposes the erase field at all first transmission elements 30. Thus, upon termination of the erase and hold fields that commenced at time *t*2, the shift register path only contains domains at the first elements 30.

The illustrated operating cycle continues with the production at time *t*3 of another propagate field simultaneous with a block B field produced by applying current to the second block conductor 44. These fields extend each reverse magnetization domain which is in a first transmission element 30 forward along the path 12 to the second transmission element 32 of the next shift register stage; the block current in the block conductor segments 44*a* and 44*b* prevent domain propagation back along the path 12 to a preceding element and prevent domain growth forward beyond each second transmission element.

The operating cycle continues with another erase and hold operation, commencing at time *t*4 during which the drive coil 36 produces an erase field and the hold conductor 38 produces a hold field with a polarity to prevent erasure of domains from the second transmission elements of the path 12, i.e. with current of the opposite polarity from that applied for the first hold field of the cycle. The illustrated single hold conductor 38 provides a selective hold operation for hold currents of opposite polarities due to the fact that it threads across each first transmission element of the shift register in one direction and threads across each second transmission element of the shift register in the opposite direction. The additional crossing of the hold conductor over each leg-interconnecting element has no effect on the shift register operation.

As also shown in FIG. 2, the output unit 26 is strobed to sense the arrival of a ONE-identifying domain at the output port 16 during the second propagate and block operation of each cycle. The timing of the read strobe pulse after time *t*3 depends on the distance a domain must travel from the last first transmission element 30 in the register to the output port 16. This distance is fixed for a given shift register construction.

Although FIG. 2 shows the write operation occurring during the first propagate step of each cycle, and the read operation during the second propagate step, these operations can be reversed by starting the cycle at time *t*3 and successively progressing, in each operating cycle, through the operations shown at times *t*3, *t*4, *t*1 and *t*2.

It is preferred, for utmost reliability, that each block field be present at least as long as the simultaneous propagate field, and that each hold field be present at least as long as the simultaneous erase field.

By way of example, for a shift register as shown in FIG. 1 with a folded path 12, and having the hold conductor cross the path at 14 mil spacings center-to-center, each propagate field can be present for a minimum time in the order of 0.5 microsecond to 1.5 microseconds, and each erase field can be as brief as 0.5 microsecond. In this regard, it will be appreciated that the longer propagate field is required to extend a domain along a V-shaped leg-interconnecting path element than elsewhere along the path.

With further reference to FIGS. 1 and 2, the shift register 10 can propagate domains along path 12 in the back direction, i.e. from the output port 16 to the input port 14, simply by interchanging the two block fields of each cycle. That is, the shift register advances domains in the back direction when operated according to the cycle of FIG. 2 except that the block B field is produced first in each cycle, and then the block A field. Alternatively, reverse domain propagation can be obtained simply by interchanging the hold field currents from the relation shown in FIG. 2.

Since the shift register can propagate domains in either direction along the path 12 either by reversing the block field order or by reversing the hold currents, it will be realized that the shift register can move domains back and forth between any two adjacent path elements, or propagate the domains, simply by sequence with which the control unit 48 operates the block current source 46 or the hold current source 40.

For example, with the drive and hold fields exactly as in FIG. 2, the shift register will move domains back and forth between adjacent path elements if the block A field is produced during every propagate field time, and the block B field is not produced.

FIGS. 3*a*–3*e* illustrate successive conditions of reverse domains in a cycle of operation for a shift register 50 constructed in the same manner as the shift register 10 of FIG. 1 except that the path 52 has, for simplicity, only two legs 52*a* and 52*b* and that it has five block conductor segments crossing each leg of the path. Also for simplicity, the hold conductor 54 is shown only in FIG. 3A; it has the same back and forth configuration as the hold conductor 38 of FIG. 1 except that it crosses each path leg five times.

The register 50 has five block conductor segments 56*a*, 58*a*, 56*b*, 58*b*, and 56*c* arranged and interconnected in the same manner as the FIG. 1 block conductors. However, the provision of an odd number of block conductors in the register 50 results in domains traversing folded, leg-interconnecting elements at both ends of a folded path consistently during only one of the two propagate steps of each cycle. This has the advantage of allowing the operating cycle to employ a shorter propagate step when no folded elements are traversed than in the other propagate step.

Figure 3E:
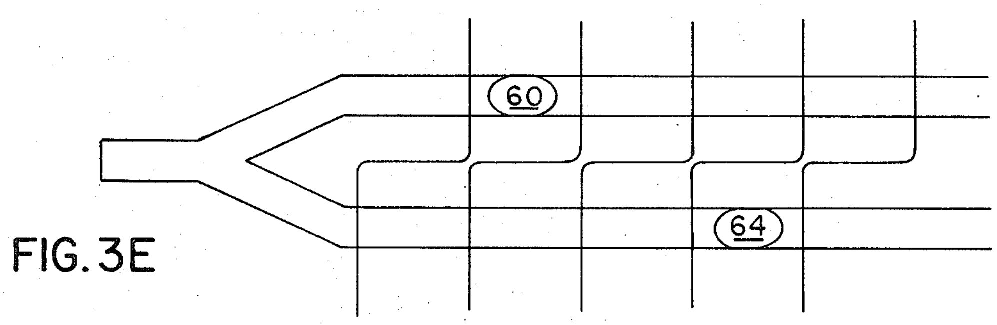
FIGS. 3*a* through 3*e* are pictorial representations of a fragment of a shift register according to the invention illustrating successive sequences in the operation thereof.
Figure 3D:
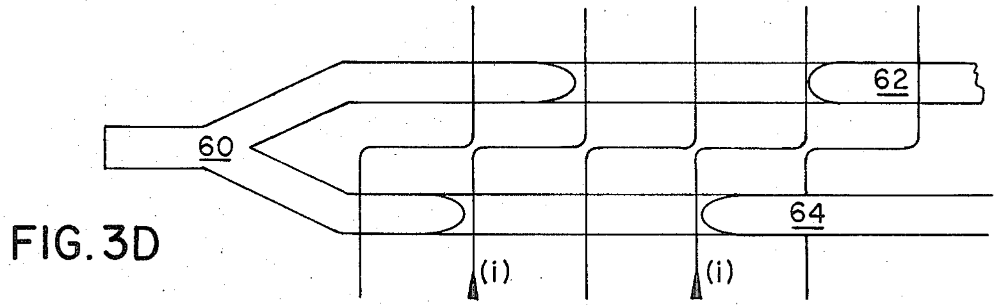
Figure 3C:
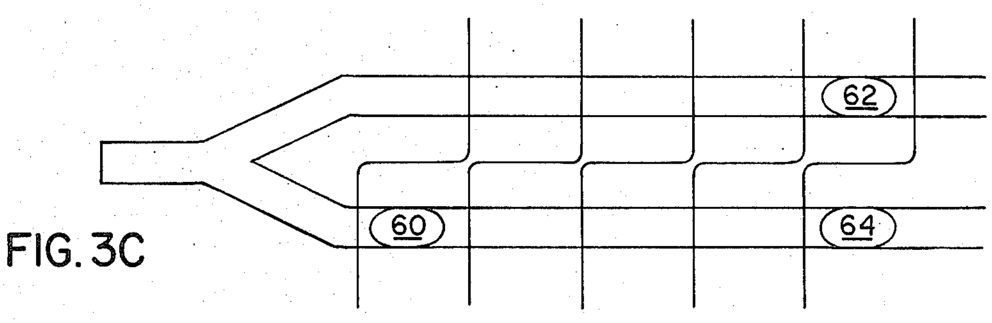
Figure 3B:
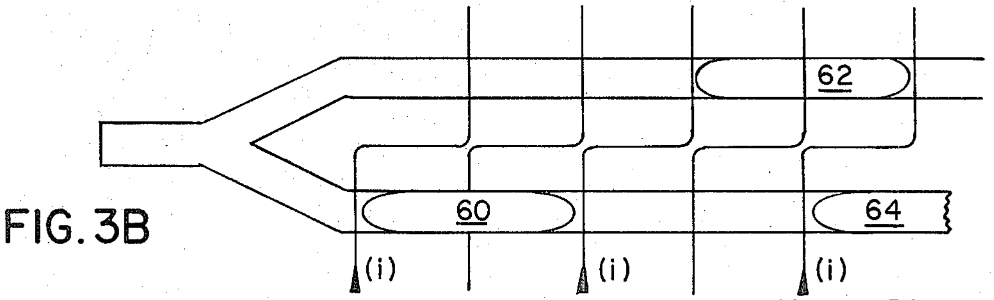
Figure 3A:
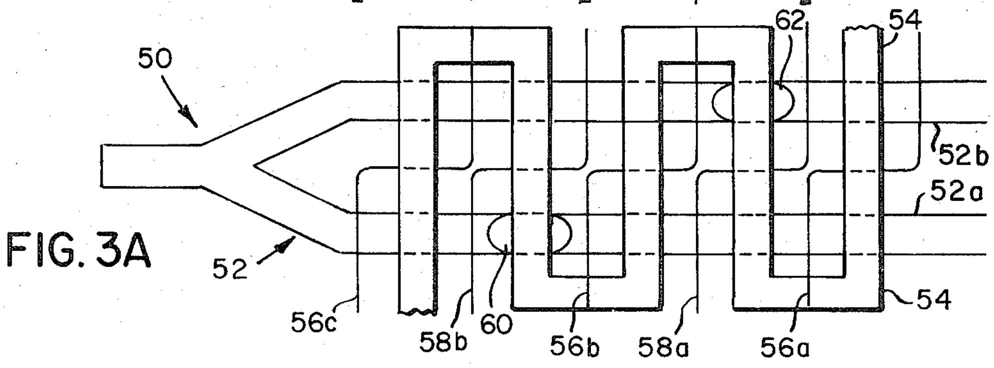

FIG. 3*a* shows the register with a single domain 60 confined in a single path element of leg 52*a* and another domain 62 in leg 52*b* at the start of an operating cycle. FIG. 3*b* shows the expanded condition of these two domains after application of the first propagate and block fields in the cycle. The block fields at this time result from current (*i*) applied to the segments of block conductor 56, as indicated, and each domain 60 and 62 has expanded forward along path 52 to the next path element.

Also during the first propagate step of the illustrated cycle, a new domain 64 is nucleated into leg 52*a* and expands until it reaches block conductor segment 56*a*.

When erase and hold fields are applied to the shift register 50, the domains 60, 62 and 64 are confined to single path elements as shown in FIG. 3*c*. The next propagate step, with blocking current (*i*) applied to block conductor segments 58*a* and 58*b*, expands the domain 64 forward along leg 52*a* by one path element, and expands domain 60 to the elongated path element that interconnects the two path legs. The domain 62 is expanded to the output end of the path, where it is read out in the manner described above with reference to FIG. 1. Note however that if the register 50 has a third leg fed from the right end of leg 52*b*, domain 62 would at this time traverse an elongated leg-interconnecting element. That is, as noted above, both the right-end and the left-end leg-interconnecting path elements propagate domains during the same single propagate step when the register has an odd number of block conductor segments as shown in FIG. 3.

FIG. 3*e* shows the condition of the register 50 after the final erase and hold step of the operating cycle.

Figure 4:
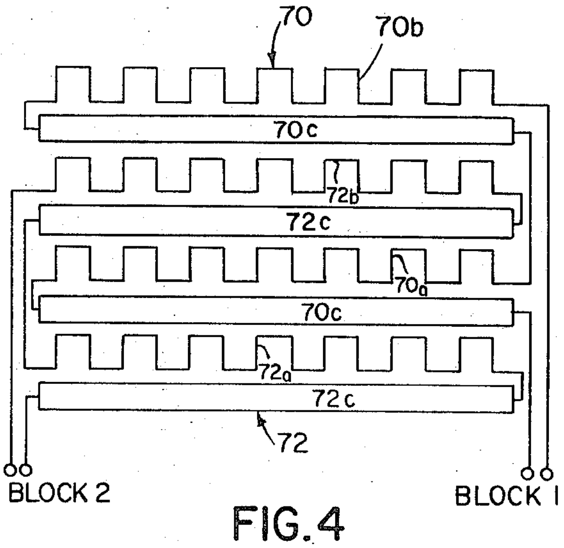
FIG. 4 shows another pattern for the block field conductors for use in the shift register of FIG. 1.

FIG. 4 shows another arrangement of block conductors that can be used in place of the arrangement shown in FIG. 1. In particular, the arrangement of block conductors 42 and 44 shown in FIG. 1, with a spiral-type pattern, allows compact construction and hence high bit density, and allows wide margins on the block currents. This is because the interconnecting segments and consequently their magnetic fields are removed from the shift register path. However, where lower block conductor inductance is required, the arrangement of FIG. 4 can be used. Here, two block conductors 70 and 72 have interlaced segments 72*a*, 70*a*, 72*b* and 70*b* in the same manner as the FIG. 1 segments 42*a*, 44*a*, 42*b* and 44*b*. However, in FIG. 4, the return paths 70*c* and 72*c* of the conductors are interposed between the block-field producing segments. The return paths have significant width to reduce the density of magnetic field which the currents therein produce, in order to avoid interference with the shift register operation.

Figure 5:
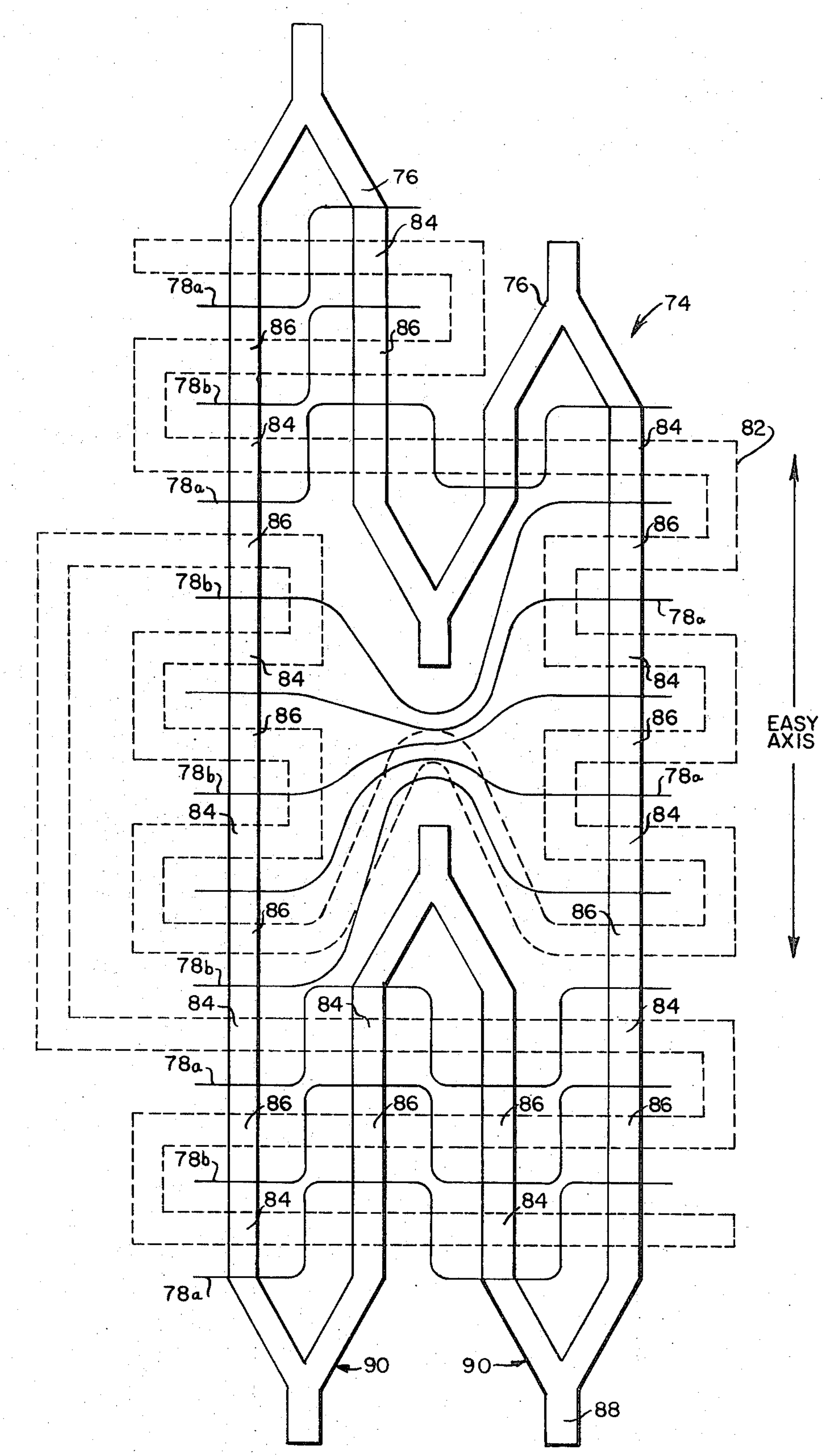
FIG. 5 shows a schematic plan view of a recirculating shift register according to the invention.

The shift register of FIG. 1 has an open-loop path 12 and hence can recirculate information by nucleating a new reverse magnetization domain in response to the read out of a domain from the output port. However, the invention also can be practiced with registers having a closed domain path and along which domains can be recirculated without involving read out and write operations. FIG. 5 is a schematic plan view of such a recirculating shift register 74 having a closed path 76. The path 76 is shown folded to illustrate the manner in which the domain capacity of the closed path can be expanded within a compact area. The register 74 is constructed in the manner described hereinabove and operates in the same manner and with the same timing sequence as discussed above with reference to FIG. 2. Accordingly, the register 74 has two sets of block conductor segments 78*a* and 78*b* that cross the path in alternate sequence to define domain-blocking sites 80 in the low-coercivity channel of the register. Current is applied in the same direction to all the block conductor segments, with one set being energized during one propagate step of each cycle, and the other set being energized during the other propagate step. Further, a hold conductor 82, in a layer different from the layers containing the path 76 and the hold conductor, crosses back and forth across transmission path between adjacent block conductor crossings to provide an alternate series succession of first and second domain-holding locations 84 and 86, respectively, within the path. The FIG. 5 configuration of the block conductor segments and of the hold conductor is illustrative of others that can be used with a recirculating shift register. Further, domains can be written into the path 76, and alternatively read out anywhere along the closed path. In addition, the stem 88 of a Y-configured corner portion 90 of the path can be lengthened to lead to a terminal port of the register.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Magnetic logic apparatus for operation as a shift register of binary information, said apparatus comprising A. plural bidirectional magnetic domain tip propagation transmission elements arranged in series succession in a signal path, with alternate first elements and second elements, between an input transmission element and an output transmission element, said path having a forward direction therealong from said input element to said output element, B. means for producing a first magnetic field for propagating magnetic domains in said transmission elements along the path, C. means for producing a second magnetic field for removing magnetic domains from said path except at said first transmission elements, and for producing a third magnetic field for removing magnetic domains from said path except at said second transmission elements, and D. means for producing a fourth magnetic field for blocking a magnetic domain present in a first transmission element from propagating along said path to the next element in a first direction and beyond the next element in the opposite second direction, and for producing a fifth magnetic field for blocking a magnetic domain present in a second transmission element from propagating along said path to the next element in said first direction and beyond the next element in the opposite, second direction.

2. Magnetic logic apparatus as defined in claim 1 further comprising control means for operating said field producing means to produce said first and fourth fields simultaneously, and alternatively to produce said first and fifth fields simultaneously.

3. Magnetic logic apparatus as defined in claim 1 further comprising control means for operating said field producing means in a cycle successively to produce said first and fourth fields simultaneously to propagate domains from first transmission elements along said path by only one transmission element, to produce said second field, to produce said first and fifth magnetic fields simultaneously to propagate magnetic domains in second transmission elements along said path by only one transmission element, and to produce said third magnetic field.

4. Magnetic logic apparatus as defined in claim 1 further comprising control means for operating said field producing means to produce said first field only during the production of one of said fourth and fifth fields.

5. Magnetic logic apparatus as defined in claim 1 further comprising control means for operating said field producing means in a cycle successively to produce said first field concurrently with one of said fourth and fifth fields during a first time interval, to produce one of said second and third fields during a second time interval, to produce said first field concurrently with the other of said fourth and fifth fields during a third time interval, and to produce the other of said second and third fields during a fourth time interval.

6. Magnetic logic apparatus as defined in claim 1 in which

A. said transmission elements provide path sections for magnetic domains and which extend substantially longitudinal to a first axis, B. said means for producing said first magnetic field includes at least a first current conductor that produces said first magnetic field directed longitudinal to said first axis, and C. said means for producing said second and third magnetic fields includes said first current conductor and a second current conductor weaving back and forth across said transmission elements transverse to said first axis to produce at each first and second element a magnetic field directed along said first axis, said magnetic fields of said second current conductor being directed at said first transmission elements opposite to the direction thereof at said second transmission elements.

7. Magnetic logic apparatus as defined in claim 1 in which said means for producing said fourth and fifth magnetic fields includes a third current conductive structure having current conducting portions thereof crossing said transmission elements transversely to said first axis for producing said fourth and fifth fields in opposition to said first field at the intersections thereof with said transmission elements.

8. In a magnetic domain tip propagation shift register having a domain path of alternate serially-arranged first and second elements extending in a forward direction from an input port to an output port and having means for propagating domains along said path and for erasing domains from said path except at selected elements, the improvement comprising A. first and second sets of block conductors transversely crossing said path for producing domain propagation-blocking magnetic fields therein, said first set of block conductors producing said fields for blocking domain propagation between first pairs of adjacent first and second path elements, and said second set of block conductors producing said fields for blocking domain propagation between second pairs of first and second path elements, where each second pair of elements consists of two adjacent elements in different first pairs thereof.

9. Magnetic logic apparatus as defined in claim 1 in which said means for producing said fourth field and said fifth field includes A. a first set of block conductors transversely crossing said path and positioned relative to said transmission elements thereof for producing said fourth field as magnetic fields for blocking domain propagation between first pairs of adjacent first and second transmission elements, and B. a second set of block conductors transversely crossing said path and positioned relative to said transmission elements thereof for producing said fifth field as magnetic fields for blocking domain propagation between second pairs of first and second transmission elements, where each second pair of elements consists of two adjacent elements in different first pairs thereof.

10. Magnetic logic apparatus as defined in claim 1 in which said means for producing said fourth and fifth fields includes A. first and second block conductors, 1. a first block conductor transversely crossing said path between every first transmission element and the next second transmission element in the forward direction, and
2. a second block conductor transversely crossing said path between every second transmission element and the next first transmission element in the forward direction.

11. Magnetic logic apparatus as defined in claim 10 in which said means for producing said fourth and fifth fields further includes electrical source means connected for applying current to each of said first and second conductors.

12. Magnetic logic apparatus as defined in claim 8 in which

A. said first set of block conductors includes a conductor segment transversely crossing said path between every first transmission element thereof and the next adjacent second transmission element in the forward direction, and B. said second set of block conductors includes a conductor segment transversely crossing said path between every second transmission element thereof and the next adjacent first transmission element in the forward direction.

* * * * *